United States Patent Office 3,124,600
Patented Mar. 10, 1964

3,124,600

ORGANOMETALLIC COMPOUNDS

Thomas H. Coffield, Heidelberg, Germany, and Robert P. M. Werner, Farmington, Mich., assignors to Ethyl Corporation, New York, N.Y., a corporation of Virginia No Drawing. Filed Aug. 20, 1959, Ser. No. 834,929
22 Claims. (Cl. 260—346.1)

This invention relates to novel organometallic compounds and methods for their preparation. More particularly, this invention relates to organometallic compounds in which a saturated ether or saturated thioether is bonded to a transition metal through a chalkogen linkage.

An object of this invention is to provide a novel class of organometallic compounds. Another object is to provide a novel class of organometallic compounds in which an ether or thioether compound is bonded to a transition metal through a chalkogen linkage. A further object is to provide a novel class of stable ether- and thioether-metal compounds having unsymmetrical configuration. Other objects will become apparent from the following discussion.

The above objects are accomplished by providing organometallic compounds of the transition metals in Groups IVB–VIII of the periodic table in which one or more saturated molecules containing an ether or thioether linkage are bonded to the metal through a chalkogen linkage, which compound is stabilized by additional covalent bonding to dissimilar electron-donating groups. The transition metal present in the novel compounds of this invention is a metal of Groups IVB–VIII of the periodic table as shown in the Handbook of Chemistry and Physics (39th edition): The Chemical Rubber Publishing Co., Cleveland, Ohio (1957), on pages 400 and 401. The Group IVB metals are titanium, zirconium and hafnium; the VB metals are vanadium, niobium and tantalum, and the VIB metals are chromium, molybdenum and tungsten. The Group VIIB metals are manganese, technetium and rhenium, and the Group VIII transition metals are iron, cobalt, nickel, ruthenium, rhodium, paladium, osmium, iridium and platinum.

The compounds of this invention may be represented by the formula:

$$(AxMByCz)Pq$$

wherein M is a Group IVB–VIII transition metal, A is a compound selected from the group consisting of saturated ethers and saturated thioethers which is bonded to the metal through a chalkogen linkage, B and C are electron-donating groups each capable of donating from one to six electrons to the metal atom, $x$ and $y$ are integers ranging from one to four, $z$ is an integer ranging from zero to three, P is an anion having a negative charge ranging from one to four, $q$ is an integer ranging from zero to four, and M has an electronic configuration ranging from two less to two more than the electronic configuration for the next higher rare gas above M in the periodic table. As shown, our compounds may be either electrically neutral or ionic. In our neutral compounds, $q$ is equal to zero and in ionic compounds, $q$ is an integer ranging from one to four. When the compounds are ionic, the portion (AxMByCz) represents a cation having a positive charge ranging from one to four.

Preferred compounds of our invention are the neutral compounds represented by the formula:

$$(AxMByCz)$$

These compounds are those set forth above when $q$ is equal to zero. In forming our neutral compounds, the metals in Group IVB–VIIB of the periodic table are preferred since they have a tendency toward formation of neutral compounds whereas the metals of Group VIII have a tendency toward the formation of ionic compounds. Further preferred metals for forming our compounds are the metals of Groups VIB and VIIB of the periodic table. These are the metals chromium, molybdenum, tungsten, manganese, rhenium and technetium. These metals form our novel compounds more readily than other metals in Groups IVB–VIII. Further, these metals impart desirable characteristics, such as increased stability, to our compounds. A most preferred metal for use in forming our compounds is molybdenum since this metal forms our compounds with particularly great ease.

Compounds of this invention are quite different from any compounds heretofore known. Unlike ether-adducts, our compounds contain an organometallic moiety which does not exist by itself but occurs only as a part of a new compound in which the metal is bonded to an ether or thioether compound through a chalkogen linkage. As an example, one of our new compounds, 2,5,8-trioxanonane molybdenum tricarbonyl, is a stable compound which is in no way similar to the ether-adducts of the prior art. In this novel compound which has the structural formula

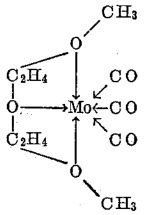

molybdenum has the electronic configuration of xenon through donation of 12 electrons to the molybdenum atom. Six of these electrons come from the diethylene glycol dimethylether molecule with each oxygen atom donating two electrons. Six additional electrons are donated by the three carbonyl groups with each carbonyl group donating two electrons. If one were to take away the ether molecule from this compound, there would be left a molybdenum tricarbonyl fragment which does not exist as a compound. This is in sharp contrast with the ether-adducts of the prior art where removal of the ether moiety leaves an existing compound. This distinction is an important one since it points up a key difference between our compounds and the ether-adducts of the prior art.

The ether and thioether compounds coordinated to the metal in the compounds of this invention are represented by A in the above formula. These compounds are saturated ethers and thioethers. That is to say, their molecules do not contain any double or triple bonds. This is an important property since ethers and thioethers which are unsaturated have a tendency toward formation of polymers by virtue of the reactive nature of the double and triple bonds. This result is undesirable and is avoided in our compounds by use of the saturated ethers and thioethers.

The saturated ethers and thioethers which are coordinated to the metal in the formation of our compounds may be either aliphatic or cyclic ethers. The aliphatic ethers may be straight or branched chain and are represented by the formulae:

$$R'—X—R',\ R'—X—R—X—R'$$

In these formulae, R represents a bridging group which is a straight or branched chain alkylene group containing from one to 20 carbon atoms. The chalkogen atoms (oxygen or sulfur) represented by X in the above formulae are connected to the alkylene group in such a manner that there are from one to 6 carbon atoms separating the chalkogen atoms. Most preferably, there are 2 carbon atoms separating the chalkogen atoms. The requirement as to the number of carbon atoms separating the chalkogen atoms is determined by steric considerations. More than the specified number of carbon atoms between chalkogen atoms may place them so far apart that they cannot both be bonded to the same metal atom to form compounds of our invention.

The bridging R group may also be a cycloaklylene group. It may be a saturated ring containing from 4 to 6 carbon atoms. From one to 4 carbon atoms separate the chalkogen atoms attached to the alkylene group. Preferably, the number of carbon atoms ranges from one to 2 and most preferably, the number of carbon atoms separating the chalkogen atoms is 2. With 2 carbon atoms separating the chalkogen atoms, the saturated ether or saturated thioether has the most favorable steric configuration so that both of the chalkogen atoms are available for bonding to the metal atom in forming compounds of our invention.

The group R′ is a terminal group. In the case of polydentate saturated ethers or thioethers, R′ can be

—R—X—R′

In this case, R′ is a group comprising a bridging R group attached to oxygen or sulfur (X) and hence to a terminal group. R′ can also be a saturated straight or branched chain alkyl group containing from one to 20 carbon atoms. Further, R′ can be a saturated alicyclic group. The alicyclic ring may contain from four to six carbon atoms.

The saturated ethers or thioethers coordinated to the metal in the compounds of our invention may also be a cyclic saturated ether or thioether. It may contain from one to four chalkogen atoms in a saturated ring having from three to 10 members. The ring may, therefore, contain carbon, oxygen or sulfur atoms, and the total number of such atoms in the ring may vary from three to 10. In the ring, there are from one to four carbon atoms separating adjacent chalkogen atoms. Preferably, there are one to two carbon atoms separating adjacent chalkogen atoms. Most preferably, there are two carbon atoms separating adjacent chalkogen atoms. The requirement as to the number of carbon atoms separating adjacent chalkogen atoms is determined by the steric requirements necessary to the formation of our novel compounds. When the number of separating carbon atoms is equal to two, the cyclic saturated ether or thioether is most readily bonded to the metal atom in forming our novel compounds.

The saturated ether or thioether may also comprise a cyclic ether substituted with an aliphatic ether. In this case, the aliphatic ethers described above having the formula R′—X—R′ or R′—X—R—X—R′ may be substituents on the cyclic ether or thioether defined above.

From the above description, it can be seen that the saturated ether and thioether compounds may be mono or polydentate in structure. They may be simple mono ethers such as diethylether, diethylthioether, dibutylether, dipentylthioether and the like. Further, they may be diethers such as ethyleneglycol dimethylether, propyleneglycol dibutylthioether, hexyleneglycol diamylether and the like. Typical tridentate ethers which may be bonded to the metal atom in the compounds of our invention are diethylene glycol dimethylether, diethyleneglycol dibutylether and the like. They may be cyclic ethers or thioethers such as ethylene oxide, tetrahydrofuran, pentahydropyrane, dioxane, trioxane, 1,3,5-dioxathiane, 1,3,5-trithiane, 1,3-dioxa-5-thiacyclohexane, oxacyclodecane, 1,3-dioxetane, trimethylene sulfide and the like. Higher polyethers such as saturated tetradentate and pentadentate ethers and thioethers, polyethyleneglycol ethers and thioethers and polybutyleneglycol ethers and thioethers may also be used in forming our novel organometallic compounds.

The saturated ether or thioether molecule may also contain other functional groups capable of coordinating with the metal atom M. Thus, the ether or thioether molecule can contain mixed functional groups such as complexing or non-complexing hydroxy or nitrile groups, or primary, secondary and tertiary amines, phosphines, stibines, arsines and the like.

Typical examples of our novel ether or thioether-transition metal compounds are 2,5,8-trioxanonane manganese tricarbonyl bromide, dimethoxyethane nickel cyclopentadiene, and dipropionitrile thioether chromium tricarbonyl.

The saturated ethers are preferred to the saturated thioethers in forming the compounds of our invention. More particularly, the polydentate ethers are preferred to the monodentate ethers in forming our compounds since the compounds formed from polydentate ethers are found to be in general more stable than those formed from the monodentate ethers. The simple polydentate oxygen ethers, that is those ethers which do not contain substituents other than carbon, hydrogen and ether oxygen atoms, form a further preferred class of ethers for forming our novel compounds. These ethers are readily available and thus are more desirable from the standpoint of economics than the ethers containing hetero atoms such as phosphorus, antimony, arsenic and the like. The most preferred ether compounds for use in forming our novel compounds are the tridentate simple ethers such as diethylene glycol dimethylether, diethylene glycol diethylether, diethylene glycol dipropylether and the like. These ethers readily coordinate with the metal atom to give our novel compounds in high yield.

The corresponding seleno and telluro ethers in which a selenium or tellurium atom is the bridging group are closely analogous to the ethers and thioethers used in forming the compounds of our invention. These compounds can, therefore, also be used in forming our novel compounds.

The constituents represented by B and C in the above formula are electron-donating groups capable of coordinating with the metal atom in forming the novel compounds of our invention and donating, to the metal atom, from one to six electrons. That is to say, these groups are capable of sharing electrons with the metal atom so that the metal atom achieves a more stable structure by virtue of these added electrons. A preferred embodiment of this invention comprises those compounds in which the metal atom has attained the electron configuration of the next higher rare gas by virtue of the coordinating groups. These compounds are preferred since they are found to have high stability.

These electron donating groups in coordination with the metal are generally either organic radicals or molecular species which contain labile electrons, which electrons assume a more stable configuration in the molecule when associated with the metal atom. The electron donating groups applicable to the compounds of this invention may also be inorganic entities which are capable of existing as ions, such as hydrogen, the covalently bonded cyanides, azides and thiocyanides, and the various halogens.

Donors capable of sharing a single electron with a metal atom include monovalent organic radicals, the hydrogen atom, the cyanide group CN, and the halogens, fluorine, chlorine, bromine and iodine. These groups function as electron donors by sharing an electron with an electron of the metal atom in a single covalent bond. Typical examples of such compounds are diethoxydiethylamine cyclopentadienyl vanadium dichloride, 2,5,8-trioxanonane cyclopentadienyl titanium dicyanide, 3,6,9-trioxaundecane cyclopentadiene rhenium hydride, and dicyclohexylthioether cyclopentadienyl nickel iodide.

When the electron donor group bonded to the metal atom in a compound of this invention is, or contains, a monovalent organic radical, this organic radical preferably contains up to 13 carbon atoms. These preferred organic radicals include alkyl, aryl, alkaryl aralkyl, alkenyl radicals and the like. Typical of our compounds containing such a radical are 2,5,8-trioxanonane cyclopentadienyl chromium methyl, bis(3,7-dioxanonane) molybdenum bisphenyl, and bis(2-oxa-5-thiohexane) tetraethyl titanium.

Entities capable of sharing two electrons with a metal atom in the coordination compounds of this invention include mono olefins, carbon monoxide(carbonyl), ammonia, primary-, secondary-, and tertiary-amines, cyclic nitrogen compounds wherein the nitrogen is in the trivalent state, organo phosphine compounds, phosphine halides, arsines, stibines, bismuthines, mixed hydroorganic phosphines, stibines, arsines and bismuthines, isonitriles and the like. Typical of our compounds containing two electron-donor groups are dimethoxydimethylamine nickel carbonyl, 4,7,10-trioxatridecane cobalt bis(benzylisonitrile), 2-methoxyethyldimethylamine iron tricarbonyl, 2-oxa-5-thioheptane nickel bis-cyclopentene, (3,6-dioxaheptyl) dodecylamine manganese cyclopentadienyl and diethoxydiethylamine bis(triphenylarsine) zirconium dicarbonyl.

The nitrosyl group, NO, is an example of an entity capable of donating three electrons to a metal atom in the novel coordination compounds of this invention. Typical compounds of our invention containing a nitrosyl group are 2,5,8-trioxanonane cobalt nitrosyl, tris(tetrahydrofuran) tungsten dinitrosyl, dimethoxyethane vanadium trinitrosyl and (2,8-dioxa-5-thiononane nickel nitrosyl) bromide.

In the novel coordination compounds of this invention certain groups are capable of sharing four electrons in coordinate covalent bonds with the metal atom. These four electron donor groups include organic diamines, aliphatic diolefins, cyclic polyolefins particularly those having conjugated double bonds, although non-conjugated diolefins are also applicable. When the donor group is a diamine, best results are obtained when the methylene chain connecting the two nitrogen atoms is no longer than three carbons in length. Typical of such compounds are diethoxyethane cyclopentadiene manganese nitrosyl, 2,5,8-trioxanonane iron butadiene, and 2,5-dioxaheptanol nickel cyclooctatetraene.

The cyclopentadienyl radical contributes five electrons to certain of the novel aromatic metal coordination compounds of this invention. The cyclopentadienyl radical in these novel compounds contains from five to about 13 carbon atoms and thus includes the substituted cyclopentadienyl hydrocarbon radicals having up to eight carbon atoms in a side chain substituent which may be bonded to more than one ring carbon atom. Examples of such radicals include the octylcyclopentadienyl radical, the methylcyclopentadienyl radical, the indenyl radical and the like. Typical of such compounds are 2,5,8-trioxanonane manganese cyclopentadienyl, dicyclohexylthioether cyclopentadienyl manganese cyclopentadiene, (dimethoxyethane cyclopentadienyl nickel) iodide and diethoxyethane cobalt 4,6-dimethylindenyl.

The novel compounds of our invention may also contain electron-donating entities capable of donating six electrons to the metal in forming the novel ether and thioether metal coordination compounds of this invention. Typical six electron donors are aromatic molecules containing from six to 18 carbon atoms. Examples of such compounds are benzene, thiophene, mesitylene, toluene, biphenyl, tetralin, m-hexyl-biphenyl, styrene, methylstyrene, naphthalene, anthacene, 1-ethylnaphthalene and the like. Other six electron donors are aliphatic trienes. Preferred aliphatic trienes are those which contain three double bonds in conjugated relationship such as in the case of hexatriene, 3-methylhexatriene and 2,2-dimethylhexatriene. Typical compounds of our invention containing six electron donor groups are 3,9-dithio-6-oxadecanol chromium mesitylene, [bis(dimethoxyethane)-tropenium titanium] tetraphenylborate, 2,5,8-trioxanonane tropenium rhenide, trioxane molybdenum cyclooctatriene, and bis(di-tert-butyl-ether) nickel hexamethylbenzene.

The novel compounds of this invention are susceptible of preparation by several methods. One method comprises reaction of a compound selected from the group consisting of saturated ethers and saturated thioethers, as defined above, with a Group IVB–VIII transition metal compound. The metal compound has the formula $$(MB_dC_e)_g$$

where M is a Group IVB–VIII transition metal, B and C are, as previously defined, electron-donating groups capable of donating from one to six electrons to the metal atom, $d$ is an integer ranging from one to six, $e$ is an integer ranging from zero to five, and $g$ is an integer ranging from one to four. Typical examples of such compounds are cycloheptatriene chromium tricarbonyl, cycloocta-1,3,5,-triene tungsten tricarbonyl, bicycloheptadiene molybdenum tetracarbonyl, cycloheptatriene molybdenum tricarbonyl, molybdenum hexacarbonyl, chromium hexacarbonyl, tungsten hexacarbonyl, nickel tetracarbonyl, bicycloheptadiene iron tricarbonyl, nitroso manganese tetracarbonyl, dibromo dimanganese octacarbonyl, triiron dodecacarbonyl, cyclopentadienyl manganese benzene, dichloro dimanganese octacarbonyl, diiodo dimanganese octacarbonyl, bromo manganese pentacarbonyl, chloro manganese pentacarbonyl, iodo manganese pentacarbonyl and dicyclopentadienyl titanium dichloride. A preferred group of metal compounds for use in this process are those compounds in which $e$ is equal to zero, B is a carbonyl group and $g$ is equal to one or two such as dimanganese decacarbonyl. Further preferred metal reactants in this process are the Group VIB metal carbonyls. A most preferred metal reactant in this process is molybdenum hexacarbonyl. The order of preference for the metal reactant is determined by the ease with which the metal reactant forms our compounds when reacted with a saturated ether or thioether molecule. The most reactive metal compounds are the most preferred for use in our process.

This process may be carried out in the presence of a hydrocarbon solvent which preferably contains from about six to about 20 carbon atoms. Typical hydrocarbon solvents are the aliphatic hydrocarbons such as n-hexane, n-octane, isooctane, n-heptane, various positional isomers of hexane, octane and heptane, or mixtures of the above. The solvent may also be a cycloaliphatic hydrocarbon such as cyclohexane or methylcyclohexane. Typical aromatic hydrocarbons are benzene, toluene, ethylbenzene and xylenes, either mixed or pure.

Preferably, the solvent is an aromatic solvent such as benzene, toluene, ethylbenzene, xylenes, and the like. Most preferably, the solvent is benzene since in many cases the use of a benzene solvent aids appreciably in the process by increasing the yield and decreasing reaction time.

The above process may be carried out at temperatures between about 40 and about 190° C. A preferred temperature range is between about 60° to about 120° C. An inert gas such as nitrogen, krypton, neon, xenon, argon and the like is preferably used to blanket the reaction mixture. The process may be carried out under pressures ranging from about atmospheric to about 150 atmospheres. Generally, however, the process goes with ease at atmospheric pressure and does not require high pressure. The reaction mixture is preferably agitated so as to increase the reaction rate. Agitation is not essential, however.

A further process for forming our compounds involves reaction between a compound selected from the group consisting of saturated ethers and thioethers, as defined above, with a compound selected from the group consisting of aromatic and cyclopentadienyl compounds of Group IVB–VIII metals. These metal compounds are known in the art and include, for example, dibenzene chlormium, mesitylene chromium tricarbonyl, anisole molybdenum tricarbonyl, methylcyclopentadienyl manganesetricarbonyl, cyclopentadienyl manganese benzene, benzene molybdenum tricarbonyl, 1,2,4-trimethylbenzene chromium tricarbonyl, cyclopentadienyl manganese mesitylene, dicyclopentadienyl titanium dicarbonyl, dicyclopentadienyl titanium dichloride, cyclopentadienyl vanadium tetracarbonyl, benzene manganese dicarbonyl cyanide, benzene manganese tricarbonyl iodide and the like. In this process, the saturated ether or thioether, as defined above, reacts with the metal compound to displace therefrom the aromatic or cyclopentadienyl moiety and replace it with one or more saturated ether or thioether molecules. This process is ordinarily carried out using an excess of saturated ether or thioether so as to force the reaction to completion. An inert solvent can be used although this is not normally necessary since the saturated ether or thioether reactant acts also as a solvent for the metal reactant. Typical solvents which may be employed are the aliphatic, cycloaliphatic and aromatic solvents defined above for use in our first described process. Our process may be carried out at temperatures ranging from about 40 to about 195° C. A preferred temperature range is from about 80 to about 120° C., since within this temperature range excellent yields are obtained with a minimum of undesirable side reactions taking place. The process may be carried out at pressures ranging up to 150 atmospheres. Generally, however, the process is conducted at atmospheric pressure or under partial vacuum down to about one-tenth atmosphere absolute. In either case, the process is preferably conducted in such a manner that the displaced aromatic or cyclopentadienyl moiety is continuously removed from the reaction mixture or the vapor phase above the reaction mixture. Withdrawal of the displaced aromatic or cyclopentadienyl moiety favorably influences the equilibrium conditions and facilitates formation of the novel compounds of this invention in good yields. The process is generally carried out in the presence of an inert blanketing gas such as nitrogen, krypton, neon, xenon, argon and the like. Agitation of the reaction mixture is not essential but is normally used to speed up the reaction rate.

A still further process which may be used in forming the novel compounds of our invention involves reaction of a compound having the formula $$(A_xMB_yC_z)P_q$$

as defined above, with a compound, A′, selected from the group consisting of saturated ethers and saturated thioethers to form a new compound:

$$A'_xMB_yC_z)P_q$$

In this reaction, one ether or thioether displaces another and different ether or thioether to form a new ether or thioether-transition metal compound. A′ may be any of the ethers or thioethers as defined above in describing A. The process is normally carried out using an excess of the ether or thioether, A′, so as to force the reaction to completion. The process may be carried out between about 0° C. and about 180° C. A preferred temperature range is from about 20° C. to about 50° C. since highest yields and a minimum of undesirable side reactions are obtained using these reaction temperatures. The reaction may be carried out at pressures as high as 3000 p.s.i.g. Normally, however, reaction is carried out at atmospheric pressure or under partial vacuum down to about three pounds per square inch absolute. In either case, the displaced ether, A, is preferably removed from the vapor or liquid phase by distillation or extraction so as to favorably affect the equilibrium conditions of the reaction and facilitate the exchange of A′ for A. The exchange is further facilitated by repeated treatment of the reaction product with excess ether, A′, and isolating the product therefrom. The process may be carried out under a blanket of a protective neutral gas such as nitrogen, krypton, neon, xenon and argon. The reaction mixture is generally stirred so as to increase the reaction rate.

The compounds of our invention may be either electrically neutral compounds or ionic species having the formula $(A_xMB_yC_z)P_q$. Neutral compounds of our invention are either solids or liquids. Solid products may be separated from the reaction mixture by conventional means such as filtration, crystallization, extraction or sublimation. Liquid products may be separated by distillation or extraction. Chromatography is a further means for separating either solid or liquid neutral products from the reaction mixture.

Ionic compounds of our invention are either solids or liquids. They are separated by conventional means as recited above for the neutral compounds. Certain separation techniques which apply to neutral compounds are not as applicable to the recovery of ionic compounds. Sublimation is one of these.

The following examples illustrate our novel compounds, both neutral and ionic, and the processes for obtaining them. All parts and percentages are by weight unless otherwise indicated.

*Example I*

A solution comprising five moles of molybdenum hexacarbonyl in a mixture of 15 moles of benzene and 4.0 moles of diethyleneglycol dimethylether was refluxed in an atmosphere of nitrogen for four hours at 120° C. The hot solution was then filtered in the absence of air. On cooling of the clear, deep-yellow-brown filtrate, a precipitate formed. The precipitate was washed repeatedly with petroleum ether and was dried under vacuum. There was obtained a greenish-yellow crystalline solid which was 2,5,8-trioxanonane molybdenum tricarbonyl. This material is soluble in both methanol and water and exhibits bands in the infrared spectrum at 3.0, 3.45, 5.25 and 5.44 microns. The compound analyzed for 35.1 percent carbon, 4.7 percent hydrogen and 30.9 percent molybdenum. This corresponds to the calculated analysis for 2,5,8-trioxanonane molybdenum tricarbonyl ($CgH_{14}MoO_6$): C, 34.41; H, 4.46 and Mo, 30.55.

Similar compounds of our invention can be prepared in substantially the same manner as described for Example I. Thus, 2,5,8-trioxanonane chromium tricarbonyl is obtained by reaction of chromium hexacarbonyl with the dimethylether of diethyleneglycol in the presence of a very small quantity of benzene. Likewise, the reaction of bromomanganese pentacarbonyl with the dimethylether of diethyleneglycol in the presence of a very small quantity of benzene will produce the compound (2,5,8-trioxanonane manganese tricarbonyl) bromide. By a similar reaction sequence, dicyclopentadienyl titanium dichloride will react with the dimethylether of diethyleneglycol in the presence of a small quantity of magnesium to form the compound 2,5,8-trioxanonane cyclopentadienyl titanium chloride.

*Example II*

Three parts of benzene molybdenum tricarbonyl were heated with 15 parts of diethyleneglycol dibutylether under an atmosphere of nitrogen. The temperature of the mixture was maintained at 150° C. for about 30 minutes during which time the liberated benzene was removed. Then, filter aid (Celite) was added, and the mixture was filtered hot under nitrogen pressure. Cooling of the dark filtrate with the slow addition of petroleum ether gave a grey-brown crystalline precipitate (5,8,11-trioxapentadecane molybdenum tricarbonyl) which was washed with petroleum ether and dried. It was air sensitive and had to be kept under a blanket of protective gas. Its analysis corresponded to the calculated value for 5,8,11-trioxapentadecane molybdenum tricarbonyl.

By a similar reaction sequence to that employed in Example II, the compound (2,5,8-trioxanonane manganese tricarbonyl) iodide is prepared by reaction of (benzene manganese tricarbonyl) iodide with the dimethylether of diethyleneglycol under slight vacuum conditions at a temperature of about 50° C. Another reaction of this type is that of disodio (cyclopentadienyltricarbonylo vanadate) with the dimethylether of diethyleneglycol in the presence of a small amount of ferrous chloride to form sodium (2,5,8-trioxanonane tricarbonylo vanadate). A still further reaction of this type within our invention is that of cyclopentadienyl vanadium tetracarbonyl with the dimethylether of diethyleneglycol in the presence of a slight quantity of ferrous chloride to form 2,5,8-trioxanonane vanadium tetracarbonyl. Likewise, the compound dimethoxyethane tungsten tetracarbonyl is formed by reaction of bicycloheptadiene tungsten tetracarbonyl with dimethoxyethane.

*Example III*

The procedure of Example I was repeated using as reactants a mixture of 11.4 moles of molybdenum hexacarbonyl, 100 moles of purified diethyleneglycol dimethylether and 33 moles of benzene. The diethyleneglycol dimethylether which was used had been purified by distilling it over sodiobenzophenone. The reaction mixture was refluxed for seven hours under a protective blanket of nitrogen. It was then filtered to remove any solids, and the filtrate was cooled. On cooling, a crystalline precipitate was obtained. This precipitate was extracted with petroleum ether, and the precipitate was then subjected to vacuum sublimation. There were recovered 3.8 moles of unreacted molybdenum hexacarbonyl and 5.6 moles of the product 2,5,8-trioxanonane molybdenum tricarbonyl. This corresponded to a 74 percent yield of product based on the amount of molybdenum hexacarbonyl consumed in the reaction. Its analysis was the same as that of the product in Example I.

*Example IV*

One and thirty-four hundredths moles of 2,5,8-trioxanonane molybdenum tricarbonyl was mixed with 20 moles of tetrahydrofuran whereupon the solution attained a deep red-brown color. Slow addition of petroleum ether to the stirred solution precipitated olive-brown crystals which were filtered and washed with petroleum ether. This operation was repeated four times in order to rid the crystalline product of diethyleneglycol dimethylether. The crystals were then dried to give 1.11 moles of tris-tetrahydrofuran molybdenum tricarbonyl (83 percent yield). The material was water soluble and air sensitive. On decomposition of the compound, tetrahydrofuran was liberated. The molybdenum analysis was 25.8 percent which was somewhat higher than the 24.2 percent calculated value. This resulted from slight decomposition of the compound during the analytical procedure. Processes similar to that of Example IV can be utilized in forming compounds of our invention. For example, when 2,5,8-trioxanonane molybdenum tricarbonyl is reacted with hexaethyleneglycol dimethylether, the compound 2,5,8,11,14,17,20-heptaoxa-n-heneicosane bis (molybdenum tricarbonyl) is formed. Similarly, the reaction between 2,5,8-trioxanonane chromium tricarbonyl and 1 - dimethylarsine - 2 - (1,3 - dioxabutyl)cyclohexane in a dimethylformamide solvent, forms the compound 1 - dimethylarsine-2-(1,3-dioxabutyl)cyclohexane chromium tricarbonyl. A further reaction of this general type is that of sodium (2,5,8-trioxanonane tricarbonylo vanadate) with a mixture of 2,2′-dimethoxytriethylstibine and ethyl iodide to form 2,2′-dimethoxytriethylstibine methyl vanadium tricarbonyl. Similarly, the reaction between 2,5,8-trioxanonane chromium tricarbonyl and $\beta,\beta'$-thiodipropionitrile forms $\beta,\beta'$-thiodipropionitrile chromium tricarbonyl.

*Example V*

One mole of bis-[tris(trifluoromethyl) phosphine] nickel dicarbonyl is heated with eight moles of ethyleneglycol dimethylether in an autoclave. After holding the reaction mixture at a temperature of 200° C. for eight hours, the autoclave is discharged. The reaction mixture is filtered and the precipitate is recrystallized from dimethylether to give a good yield of dimethoxyethane bis[tris(trifluoromethyl) phosphine] nickel.

Similarly, when dicyclopentadienyl titanium dicarbonyl is reacted with 2,2′-thio-diethylamine in the presence of ferrous chloride, there is formed the product bis[2,2′-thio-di(ethylamine)] titanium dicarbonyl. Likewise, when tetraphenylcyclobutadiene nickel dichloride is reacted with 1-mercapto-2-methoxycyclohexane in the presence of aluminum powder, there is formed 1-mercapto - 2 - methoxycyclohexane nickel tetraphenylcyclobutadiene.

*Example VI*

A mixture comprising one mole of nickel tetracarbonyl and five moles of 1,2-diethoxycyclohexane in 10 moles of n-octane is refluxed for 14 hours. On cooling, 1,2-diethoxycyclohexane nickel dicarbonyl is obtained after triturating the somewhat smeary precipitate with ether.

*Example VII*

One mole of cobaltocene, 10 moles of carbon tetrachloride and two moles of 1,2-dimethoxycylohexane are heated for eight hours at reflux. The solvent is then stripped off and the semi-solid residue is extracted with ether. There is crystallized from the solvent, on cooling, the product 1,2-dimethoxycyclohexane cyclopentadienyl cobalt in good yield.

*Example VIII*

One mole of cyclohexadiene iron tricarbonyl is mixed with four moles of 1-hydroxy-3,6-dioxadodecane and warmed to 100° C. under slight vacuum while removing the displaced cyclohexadiene. The reaction mixture is then filtered and the precipitate is dissolved in methanol. On cooling, the product 1-hydroxy-3,6-dioxadodecane iron tricarbonyl is precipitated.

*Example IX*

One mole of benzene manganese tricarbonyl iodide and 10 moles of diethylene glycol dimethylether are heated to about 70° C. under a vacuum of 40 millimeters. On workup of the reaction mixture, there is obtained a good yield of (2,5,8-trioxanonane manganese tricarbonyl) iodide.

*Example X*

One mole of trifluoromethyl manganese pentacarbonyl and 10 moles of diethylene glycol dimethylether are heated at a temperature of 120 to 140° C. for 6 hours. On cooling, followed by filtration, there is obtained a good yield of 2,5,8-trioxanonane trifluoromethyl manganese dicarbonyl.

*Example XI*

One mole of dicyclopentadienyl diphenyl titanium and one and one-half moles of morpholinoethyl ethyl ether in 10 moles of n-nonane are heated at reflux for 4 hours. On cooling and workup of the reaction mixture, there is obtained $\omega$-ethoxy(N - ethylmorpholine)cyclopentadienyl diphenyl titanium in good yield.

In another run the compound vanadium trichloride was reacted with diethylene glycol dimethyl ether and carbon monoxide in the presence of a sodium dispersion. The vanadium trichloride, sodium dispersion and diethylene glycol dimethyl ether were charged to an autoclave which was pressurized to 3000 p.s.i.g. with carbon monoxide. The reaction was conducted at 100° C. yielding a yellow solid which was 2,5,8-trioxanonane vanadium tricarbonyl hydride. Then compound melted at 173–176° C. with decomposition. It was soluble in ether, moderately soluble in benzene and insoluble in carbon tetrachloride and petroleum ether. The yield of product was 67 percent.

The compounds of this invention find their main application as intermediates in the preparation of other useful organo-metallic compounds. They react readily with nitrogen compounds such as ammonia, primary-, secondary-, and tertiary-amines and nitriles, phosphines, arsines, stibines and pyridines through displacement of the ether moiety to form many new and useful organometallic compounds. Typical of these compounds are triammonia molybdenum tricarbonyl, diethylenetriamine molybdenum tricarbonyl, tripyridine molybdenum tricarbonyl, tris(triphenylphosphine)molybdenum tricarbonyl, tris(triphenylarsine)molybdenum tricarbonyl and tris(triphenylstibine) molybdenum tricarbonyl. The following is an example of such a reaction.

*Example XII*

One part of diethylene glycol dimethyl ether molybdenum tricarbonyl is dissolved in 10 parts of diethylenetriamine. Slow addition of ether produced a light-yellow crystalline precipitate which was washed with ether and dried to yield the compound, diethylenetriamine molybdenum tricarbonyl. This material was water insoluble and had an analysis of 32.7 percent molybdenum and 14.8 percent nitrogen. Calculated for $C_7H_{13}MoO_3N_3$ was Mo, 33.87, and N, 14.84. Its infrared spectrum showed bands at 5.3 and 5.8 microns.

These new compounds which may be formed from our ether compounds are useful antiknocks when added to a petroleum hydrocarbon. Further, they may be used as supplemental antiknocks, that is, in addition to a lead antiknock already present in the fuel. Typical lead antiknocks are the lead alkyls such as tetraethyllead, tetrabutyllead, tetramethyllead and various mixed alkyls such as dimethyldiethyllead, diethyldibutyllead and the like. When used as an antiknock, these compounds may be present in the gasoline in combination with typical halogen scavengers such as ethylene dichloride, ethylene dibromide and the like.

Our ether compounds are not only useful intermediates as shown above but are further useful in their own right in metal plating applications. In order to effect metal plating with our novel compounds, they are decomposed in an evacuated space containing the object to be plated. On decomposition, they lay down a film of metal on the object contained within the enclosure. The gaseous plating may be carried out in the presence of an inert gas so as to prevent oxidation of the metal during the plating operation.

The gaseous plating technique described above finds wide application in forming coatings which are not only decorative but also protect the underlying substrate material. When the metal, laid down is a conductor, such as molybdenum, this technique enables the preparation of printed circuits which find wide application in the electrical arts.

Deposition of metal on a glass cloth illustrates the applied processes. A glass cloth band weighing one gram is dried for one hour in an oven at 150° C. It is then placed in a tube which is devoid of air, and there is added to the tube 0.5 gram of 2,5,8-trioxanonane molybdenum tricarbonyl. The tube is heated at 400° C. for one hour after which time the tube is cooled and opened. The cloth has a uniform metallic grey appearance and exhibits a gain in weight of about 0.02 gram. The cloth has greatly decreased resistivity and each individual fiber proves to be a conductor. An application of current to the cloth causes an increase in its temperature. Thus, a conducting cloth is prepared. This cloth can be used to reduce static electricity, for decoration, for thermal insulation by reflection and as a heating element.

Having fully described our novel compounds, their mode of preparation and their manifold utilities, we desire to be limited only within the scope of the appended claims.

We claim:

1. 2,5,8-trioxanonane molybdenum tricarbonyl.
2. 5,8,11-trioxapentadecane molybdenum tricarbonyl.
3. Tris-tetrahydrofuran molybdenum tricarbonyl.

4. Organometallic compounds having the formula $$A_xM(CO)_y$$

wherein A is selected from the class consisting of

I cyclic saturated monodentate ethers having 4 to 9 methylene groups in the ring;

II cyclic saturated monodentate thioethers having 4 to 9 methylene groups in the ring;

III aliphatic saturated bidentate and tridentate ethers wherein the oxygen atoms are separated by ethylene groups and wherein the terminal groups are alkyl radicals having one to 20 carbon atoms;

IV aliphatic saturated bidentate and tridentate thioethers wherein the sulfur atoms are separated by ethylene groups and wherein the terminal groups are alkyl radicals having one to 20 carbon atoms;

M is a Group VIB metal, $x$ is an integer equal to three when A is selected from subclasses I and II, and equal to one when A is selected from subclasses III and IV; $y$ is an integer equal to three when A is selected from subclasses I and II, and the tridentate ethers and thioethers in subclasses III and IV, and equal to four when A is selected from the bidentate ethers and thioethers in subclasses III and IV, such that the sum of $x$ and $y$ is 6 when A is a monodentate ether, the sum of $x$ and $y$ is 5 when A is a bidentate ether, and the sum of $x$ and $y$ is 4 when A is a tridentate ether, said Group VIB metal being bonded to said constituent A through a chalkogen linkage.

5. Process for the formation of the compounds of claim 4, said process comprising reacting A with a Group VIB metal hexacarbonyl.

6. The process of claim 5 wherein the reaction is carried out in the presence of an inert hydrocarbon solvent.

7. Process of claim 5 wherein the reaction is carried out in the presence of an aromatic hydrocarbon solvent selected from the class consisting of benzene, toluene, ethylbenzene and xylene.

8. The process of claim 7 wherein the aromatic solvent is benzene.

9. The process of claim 8 wherein the ether compound is 2,5,8-trioxanonane.

10. Process for the preparation of 2,5,8-trioxanonane molybdenum tricarbonyl, said process comprising reacting molybdenum hexacarbonyl with diethyleneglycol dimethylether in the presence of benzene.

11. Process for the preparation of the compounds of claim 4, said process comprising reacting A with an aromatic Group VIB metal tricarbonyl compound whose aromatic molecule is selected from the class consisting of benzene, mesitylene, 1,2,4-trimethylbenzene and anisole.

12. Process of claim 11 wherein the aromatic molecule within the aromatic Group VIB metal tricarbonyl compound is benzene.

13. Process for the preparation of 5,8,11-trioxapentadecane molybdenum tricarbonyl, said process comprising reacting diethyleneglycol dibutylether with benzene molybdenum tricarbonyl.

14. Process for the preparation of the compounds of claim 4, said process comprising reacting A with a reactant having the formula $A_x'M(CO)_y$ wherein A' is selected from the same class as A, such that A' is different than A, whereby A replaces A' to form the compound $A_xM(CO)_y$.

15. Process for the preparation of tris(tetrahydrofuran) molybdenum tricarbonyl, said process comprising reacting 2,5,8-trioxanonane molybdenum tricarbonyl with tetrahydrofuran.

16. The compounds of claim 4 wherein M is molybdenum.

17. Process for the formation of the compounds of claim 16, said process comprising reacting A with molybdenum hexacarbonyl.

18. The process of claim 17 wherein the reaction is carried out in the presence of an inert hydrocarbon solvent.

19. The process of claim 17 wherein the reaction is carried out in the presence of an aromatic hydrocarbon solvent selected from the class consisting of benzene, toluene, ethylbenzene and xylene.

20. The process of claim 19 wherein the aromatic solvent is benzene.

21. Process for the preparation of the compounds of claim 16, said process comprising reacting A with an aromatic molybdenum tricarbonyl compound whose aromatic molecule is selected from the class consisting of benzene, mesitylene, 1,2,4-trimethylbenzene and anisole.

22. Process for the preparation of the compounds of claim 16, said process comprising reacting A with a reactant having the formula $A_x'Mo(CO)_y$ wherein A' is selected from the same class as A, such that A' is different than A, whereby A replaces A' to form the compound $A_xMo(CO)_y$.

References Cited in the file of this patent

UNITED STATES PATENTS

| | | |
|---|---|---|
| 2,818,416 | Brown et al. | Dec. 31, 1957 |
| 2,868,700 | Brown et al. | Jan. 13, 1959 |
| 2,898,354 | Shapiro et al. | Aug. 4, 1959 |
| 2,910,492 | Brown et al. | Oct. 27, 1959 |
| 2,916,506 | Axtell et al. | Dec. 8, 1959 |

OTHER REFERENCES

Rheinboldt et al.: "J. Prak, Chem." 149, pages 30–64 (1937).

Fischer et al.: "Chem. Ber." 91, No. 12, pages 2763–2772 (Dec. 19, 1958).

Fischer et al.: Ber. Deut. Chem., No. 11, pp. 2395–2399 (1958).

Piper et al.: Naturwissenschaften, 42, No. 33, page 625 (1955).